US009148381B2

(12) United States Patent
Dunlap et al.

(10) Patent No.: US 9,148,381 B2
(45) Date of Patent: Sep. 29, 2015

(54) CLOUD COMPUTING ENHANCED GATEWAY FOR COMMUNICATION NETWORKS

(71) Applicant: QUALCOMM Incorporated, San Diego, CA (US)

(72) Inventors: Wayne G. Dunlap, Austin, TX (US); Benjamin M. Menchaca, Austin, TX (US); Ryan A. Nowakowski, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 13/655,399

(22) Filed: Oct. 18, 2012

(65) Prior Publication Data

US 2013/0103827 A1 Apr. 25, 2013

Related U.S. Application Data

(60) Provisional application No. 61/550,344, filed on Oct. 21, 2011.

(51) Int. Cl.
*G06F 15/16* (2006.01)
*H04L 12/851* (2013.01)
(Continued)

(52) U.S. Cl.
CPC ........ *H04L 47/2441* (2013.01); *H04L 41/0816* (2013.01); *H04L 41/0893* (2013.01); *H04L 47/13* (2013.01); *H04L 47/19* (2013.01); *H04L 47/20* (2013.01); *H04L 47/2475* (2013.01); *H04L 47/2483* (2013.01)

(58) Field of Classification Search
CPC ...................................................... G06F 15/173
USPC ......................................... 709/224, 244, 220
See application file for complete search history.

(56) References Cited

U.S. PATENT DOCUMENTS 6,459,682 B1 10/2002 Ellesson et al.
6,493,317 B1 12/2002 Ma
(Continued)

FOREIGN PATENT DOCUMENTS

CN 101977146 A 2/2011
CN 103827866 5/2014
(Continued)

OTHER PUBLICATIONS

Co-pending U.S. Appl. No. 11/197,773, filed Aug. 3, 2005, pp. 44.
(Continued)

*Primary Examiner* — Jude Jean Gilles
(74) *Attorney, Agent, or Firm* — DeLizio Law, PLLC

(57) ABSTRACT

A network traffic managing node of a local area network, such as a router or gateway, can monitor network traffic of the local area network. A network event associated with the local area network is detected using the network traffic managing node. The network event is reported from the network traffic managing node to one or more servers of a cloud-based computing network. A network policy update for the network traffic managing node is received from the cloud-based computing network. The network policy update is based, at least in part, on a type of network event reported to the cloud-based computing network. The network policy update is implemented at the network traffic managing node to process and/or resolve the network event.

36 Claims, 5 Drawing Sheets

(51) Int. Cl.
*H04L 12/24* (2006.01)
*H04L 12/801* (2013.01)
*H04L 12/859* (2013.01)
*H04L 12/813* (2013.01)

(56) References Cited

U.S. PATENT DOCUMENTS

| | | | |
|---|---|---|---|
| 6,591,299 | B2 | 7/2003 | Riddle et al. |
| 6,904,020 | B1 | 6/2005 | Love et al. |
| 7,043,659 | B1 | 5/2006 | Klein et al. |
| 7,215,678 | B1 | 5/2007 | Ahlfors et al. |
| 7,493,407 | B2 | 2/2009 | Leedom et al. |
| 7,664,048 | B1 | 2/2010 | Yung et al. |
| 7,782,786 | B1 | 8/2010 | Natarajan et al. |
| 7,957,291 | B2 | 6/2011 | Boch et al. |
| 8,004,973 | B2 | 8/2011 | Budhani et al. |
| 8,131,852 | B1 | 3/2012 | Miller et al. |
| 8,370,407 | B1 * | 2/2013 | Devarajan et al. ............. 707/899 |
| 8,417,938 | B1 | 4/2013 | Considine et al. |
| 8,542,588 | B2 | 9/2013 | Kuhn |
| 8,601,134 | B1 | 12/2013 | Sorenson, III et al. |
| 8,639,921 | B1 | 1/2014 | Sorenson, III et al. |
| 8,706,834 | B2 | 4/2014 | Sorenson, III et al. |
| 8,761,100 | B2 * | 6/2014 | Negus et al. .................. 370/329 |
| 8,793,343 | B1 | 7/2014 | Sorenson, III et al. |
| 8,918,075 | B2 * | 12/2014 | Maier et al. ................ 455/404.2 |
| 2002/0122387 | A1 | 9/2002 | Ni |
| 2003/0229720 | A1 | 12/2003 | Kiremidjian et al. |
| 2004/0105415 | A1 * | 6/2004 | Fujiwara et al. .............. 370/338 |
| 2005/0052997 | A1 | 3/2005 | Montes Linares |
| 2005/0114541 | A1 | 5/2005 | Ghetie et al. |
| 2005/0185582 | A1 | 8/2005 | Wybenga et al. |
| 2006/0048142 | A1 | 3/2006 | Roese et al. |
| 2006/0206533 | A1 | 9/2006 | MacLaurin et al. |
| 2006/0251234 | A1 | 11/2006 | Cooke |
| 2007/0061433 | A1 | 3/2007 | Reynolds et al. |
| 2007/0143377 | A1 | 6/2007 | Waites |
| 2007/0168336 | A1 | 7/2007 | Ransil et al. |
| 2007/0180119 | A1 | 8/2007 | Khivesara et al. |
| 2008/0147735 | A1 | 6/2008 | Sloo |
| 2008/0267203 | A1 | 10/2008 | Curcio et al. |
| 2008/0273533 | A1 | 11/2008 | Deshpande |
| 2009/0059937 | A1 | 3/2009 | Kanada |
| 2009/0083326 | A1 | 3/2009 | Pelton |
| 2009/0180430 | A1 | 7/2009 | Fadell |
| 2009/0228462 | A1 | 9/2009 | Frieder et al. |
| 2009/0252219 | A1 | 10/2009 | Chen et al. |
| 2009/0300196 | A1 | 12/2009 | Haghpassand |
| 2009/0303908 | A1 | 12/2009 | Deb et al. |
| 2009/0320113 | A1 | 12/2009 | Larsen et al. |
| 2009/0323524 | A1 | 12/2009 | Kuhn |
| 2010/0023604 | A1 | 1/2010 | Verma et al. |
| 2010/0208614 | A1 | 8/2010 | Harmatos |
| 2010/0228650 | A1 | 9/2010 | Shacham et al. |
| 2010/0260048 | A1 | 10/2010 | Dolganow et al. |
| 2010/0287219 | A1 | 11/2010 | Caso et al. |
| 2010/0322255 | A1 | 12/2010 | Hao et al. |
| 2011/0106786 | A1 | 5/2011 | Waters et al. |
| 2011/0122810 | A1 | 5/2011 | Hodroj et al. |
| 2011/0231899 | A1 | 9/2011 | Pulier et al. |
| 2011/0282975 | A1 | 11/2011 | Carter |
| 2011/0289440 | A1 | 11/2011 | Carter et al. |
| 2012/0042216 | A1 | 2/2012 | Blubaugh |
| 2012/0072932 | A1 * | 3/2012 | Atwater et al. .................... 725/1 |
| 2012/0096269 | A1 * | 4/2012 | McAlister ..................... 713/171 |
| 2012/0185913 | A1 | 7/2012 | Martinez et al. |
| 2012/0330887 | A1 | 12/2012 | Young et al. |
| 2013/0007219 | A1 | 1/2013 | Sorenson, III et al. |
| 2013/0007854 | A1 | 1/2013 | Sorenson, III et al. |
| 2013/0007882 | A1 * | 1/2013 | Devarajan et al. ............. 726/24 |
| 2013/0054759 | A1 | 2/2013 | Lim et al. |
| 2013/0054763 | A1 * | 2/2013 | Van der Merwe et al. .... 709/220 |
| 2013/0100803 | A1 | 4/2013 | Menchaca et al. |
| 2013/0100955 | A1 | 4/2013 | Dunlap et al. |
| 2013/0103660 | A1 | 4/2013 | Welsh |
| 2013/0103827 | A1 | 4/2013 | Dunlap et al. |
| 2013/0124465 | A1 | 5/2013 | Pingel et al. |
| 2013/0179593 | A1 | 7/2013 | Dunlap et al. |
| 2013/0211555 | A1 | 8/2013 | Lawson et al. |
| 2013/0212214 | A1 | 8/2013 | Lawson et al. |
| 2013/0219476 | A1 | 8/2013 | Lin et al. |
| 2013/0238752 | A1 | 9/2013 | Park et al. |
| 2014/0020072 | A1 | 1/2014 | Thomas |
| 2014/0095660 | A1 | 4/2014 | Chan |
| 2014/0148255 | A1 | 5/2014 | Chan |
| 2014/0189015 | A1 | 7/2014 | Chan et al. |
| 2014/0243100 | A1 | 8/2014 | Chan |

FOREIGN PATENT DOCUMENTS

| | | |
|---|---|---|
| CN | 103828299 | 5/2014 |
| CN | 104040996 | 9/2014 |
| EP | 1750394 A2 | 2/2007 |
| EP | 1990960 A1 | 11/2008 |
| EP | 2273737 | 12/2011 |
| JP | 2008085536 | 4/2008 |
| JP | 2014537342 | 12/2014 |
| KR | 1020080086918 | 10/2010 |
| KR | 1020140057617 | 5/2014 |
| TW | 201322694 | 6/2013 |
| WO | 2006068548 A1 | 6/2006 |
| WO | 2007142567 A1 | 12/2007 |
| WO | 2010074619 A1 | 7/2010 |
| WO | 2013059742 A1 | 4/2013 |
| WO | 2013059744 | 4/2013 |
| WO | 2013059760 A1 | 4/2013 |
| WO | 2013063142 A2 | 5/2013 |
| WO | 2013106454 | 7/2013 |

OTHER PUBLICATIONS

Co-pending U.S. Appl. No. 11/969,829, filed Jan. 4, 2008, pp. 39.
Co-pending U.S. Appl. No. 13/655,602, filed Oct. 19, 2012, pp. 40.
Co-pending U.S. Appl. No. 13/737,387, filed Jan. 9, 2013, pp. 37.
Co-pending U.S. Appl. No. 13/655,395, filed Oct. 18, 2012, pages.
Co-pending U.S. Appl. No. 13/659,579, filed Oct. 24, 2012, pages.
Co-pending U.S. Appl. No. 61/550,335, filed Oct. 21, 2011, pp. 18.
Co-pending U.S. Appl. No. 61/550,339, filed Oct. 21, 2011, pp. 18.
Co-pending U.S. Appl. No. 61/550,344, filed Oct. 21, 2011, pp. 21.
Co-pending U.S. Appl. No. 61/550,814, filed Oct. 24, 2011, pp. 34.
Co-pending U.S. Appl. No. 61/584,628, filed Jan. 19, 2012, pp. 16.
Fgee, E.B., et al., "Implementing an IPv6 QoS management scheme using flow label & class of service fields", Electrical and Computer Engineering, 2004. Canadian Conference on Niagara Falls, Ont., Canada May 2-5, 2004, Piscataway, NJ, USA, IEEE, US, May 2, 2004, p. 1049, XP010734004, DOI: 10.1109/CCECE.2004.1345298 ISBN: 978-0-7803-8253-4 see sections 2.2 and 3.1.
Giroux, N., et al., "Quality of Service in ATM networks; state-of-the-art traffic management. Chapter 2", 1998, Prentice Hall PTR, XP002691732, ISBN: 0-13-095387-3 pp. 10-32, ATM traffic contract. Detailed quality of service definition.
International Search Report and Written Opinion—PCT/US2012/061216—ISA/EPO—Mar. 21, 2013.
Bicket, John C., "Bit-rate Selection in Wireless Networks", Massachusetts Institute of Technology, http://dspace.mit.edu/handle/1721.1/34116,(Feb. 2005), pp. 50.
Thottan, Marina et al., "Impact of 802.11e EDCA on Mixed TCP-based Applications", In Proceedings of the 2nd annual international workshop on Wireless internet, ACM International Conference Proceeding Series, vol. 220, http://portal.acm.org/citation.cfm"id=1234161.1234187, Aug. 2-5, 2006, pp. 9.
Partial International Search Report—PCT/US2012/061216—ISA/EPO—Jan. 30, 2013.
Preparing the WLAN for Voice, Avaya Inc., www.avaya.com/master-usa/en-us/resource/assets/whitepapers/ef-lb2731.pdf,(May 2005), pp. 16.
Tong, et al. "Bandwidth Management for Supporting Differentiated Service Aware Traffic Engineering", IEEE Transactions on Parallel and Distribuited Systems, IEEE Service Center, Los Alamitos, CA,

(56) References Cited

OTHER PUBLICATIONS

US, vol. 18, No. 9, Sep. 1, 2007, pp. 1320-1331, XP011190143, ISSN: 1045-9219, DOI: 10.1109/TPDS.2007.1052.
Suzuki, K., et al., "Home network with cloud computing for Home Management", Consumer Electronics (ISCE), 2011 IEEE 15th International Symposium on, IEEE, Jun. 14, 2011, pp. 421-425, XP032007891, DOI: 10.1109/ISCE.2011.5973862 ISBN: 978-1-61284-843-3 the whole document.
"PCT Application No. PCT/US2012/061725 International Search Report and Written Opinion", Apr. 26, 2013, 18 pages.
"PCT Application No. PCT/US2012/061214 International Search Report", Jan. 8, 2013, 9 pages.
"PCT Application No. PCT/US2012/061236 International Search Report", Jan. 23, 2013, 13 pages.
"PCT Application No. PCT/US2013/020863 International Search Report", Mar. 15, 2013, 13 pages.
"U.S. Appl. No. 12/146,141 Final Office Action", Sep. 12, 2012, 19 pages.
"U.S. Appl. No. 12/146,141 Office Action", Apr. 12, 2012, 20 pages.
"PCT Application No. PCT/US2012/061725 Written Opinion of the IPEA", Feb. 7, 2014, 7 pages.
"U.S. Appl. No. 13/655,395 Office Action", Sep. 22, 2014, 22 Pages.
"PCT Application No. PCT/US2013/020863 Written Opinion of the IPEA", Dec. 6, 2013, 7 pages.
"PCT Application No. PCT/US2012/061236 Written Opinion of IPEA", Sep. 25, 2013, 7 pages.
"PCT Application No. PCT/US2012/061216 Written Opinion of the IPEA", Oct. 31, 2013, 9 pages.
"U.S. Appl. No. 13/659,579 Office Action", Nov. 3, 2014, 18 pages.
"Korean Patent Application No. 1020147007407, KIPO Notice of Grounds for Rejection", Nov. 27, 2014, 12 pages.
"Korean Patent Application No. 10-2014-7007531, KIPO Notice of Grounds for Rejection", Nov. 26, 2014, 10 pages.
"U.S. Appl. No. 13/737,387 Office Action", Jan. 15, 2015, 24 pages.
"U.S. Appl. No. 13/655,395 Final Office Action", Feb. 24, 2015, 22 pages.

\* cited by examiner

CLOUD COMPUTING ENHANCED GATEWAY FOR COMMUNICATION NETWORKS

RELATED APPLICATIONS

This application claims the priority benefit of U.S. Provisional Application Ser. No. 61/550,344 filed on Oct. 21, 2011.

BACKGROUND

Embodiments of the inventive subject matter generally relate to the field of communication networks and, more particularly, to a cloud computing enhanced gateway for communication networks.

Local area networks (LANs), such as home or office networks, typically include a router (or gateway) that connects the LAN to a wide area network (WAN) and routes packets between the two networks. Various network devices in a LAN can access and download information from the Internet via a router, and the router can manage the various packet streams from the different network devices accessing the Internet. The router of the LAN can also provide various network administrator options for configuring and customizing the operations of the router. However, network administrators typically have to manually configure the router based on the limited information known to the network administrator regarding the network traffic and network conditions.

SUMMARY

Various embodiments are disclosed for implementing a cloud computing enhanced router for a LAN. In one embodiment, network traffic is monitored at a LAN. A network event associated with the LAN is detected. The network event is reported to one or more servers of a cloud-based computing network. A network policy update for the LAN is received from the cloud-based computing network, and implemented at the LAN. The network policy update is based, at least in part, on a type of network event reported to the cloud-based computing network.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to utilizing the cloud computing enhanced routers in home local area networks (LANs), in other examples the cloud computing enhanced routers can be used in any suitable type of network, such as an office network, a multi-dwelling network, a university network, etc. In other instances, well-known instruction instances, protocols, structures and techniques have not been shown in detail in order not to obfuscate the description.

Routers (or gateways) for communication networks are becoming increasingly complex. At the same time, competition is pushing to reduce the cost of routers. As a result, the processing power in home LAN routers today is not sufficient to leverage the sophisticated algorithms that would enhance the power of the routers, both from a performance point of view and a feature point of view. Furthermore, all routers inherently have a limited amount of available resources, such as processing power, storage, software, and other features.

Figure 1:
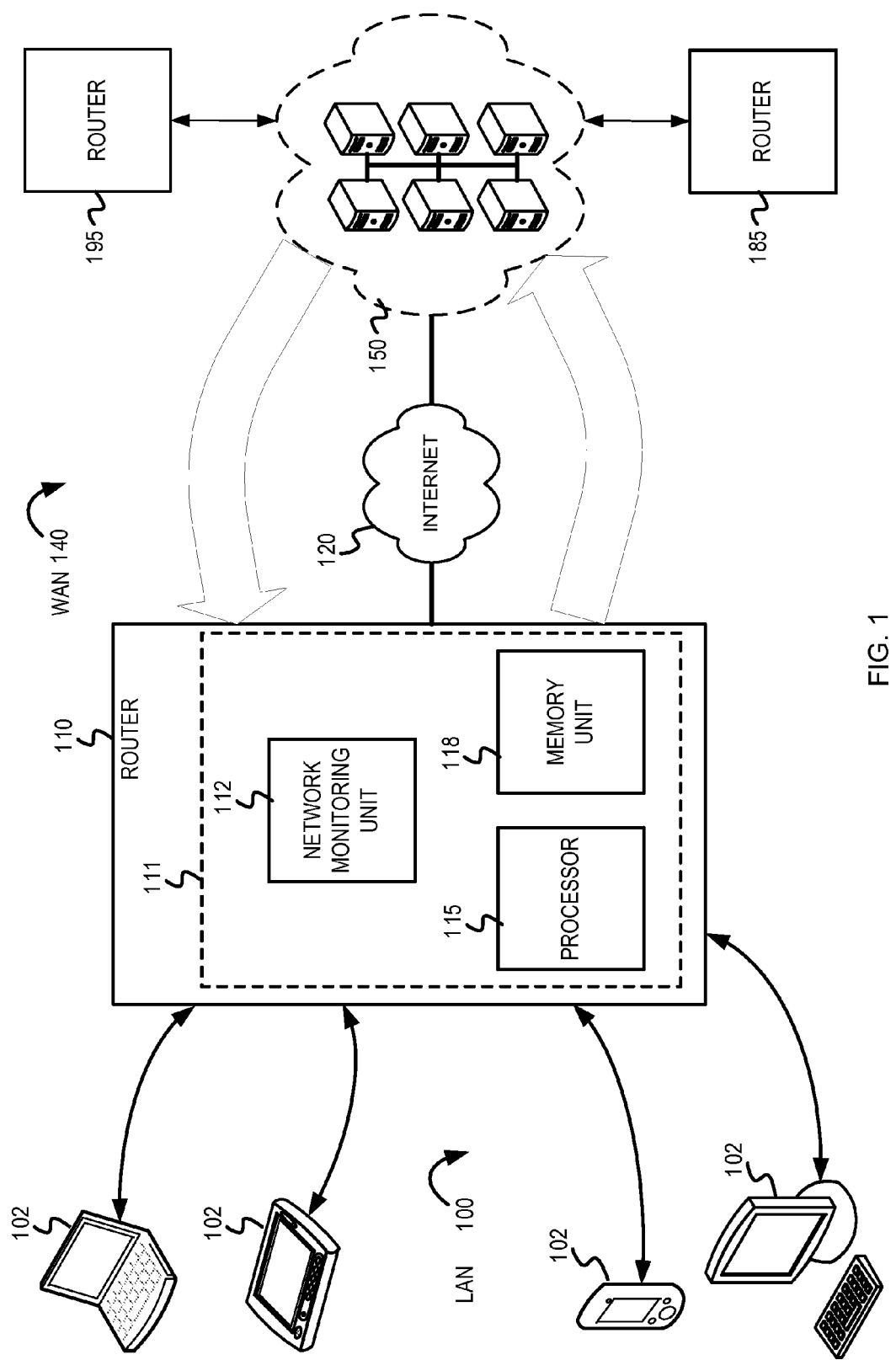
FIG. 1 is an example block diagram illustrating a cloud computing enhanced router for a communication network, according to some embodiments.

FIG. 1 is an example block diagram illustrating a cloud computing enhanced router for a communication network, according to some embodiments. The LAN 100 comprises a plurality of network devices 102 and a router 110. The plurality of network devices 102 may include various type of wired and wireless networking devices, such as notebook computers, tablet computers, mobile phones, desktop computers, digital cameras, televisions, gaming consoles, smart appliances, and other suitable devices. The router 110 (or gateway) is a node in a communication network that receives and routes packets from and to the communication network. The router 110 is a network traffic managing node between two or more networks that receives, processes, and routes packets associated with the networks. It is noted, however, that in other embodiments the LAN 100 may include other types of network traffic managing nodes and/or network traffic managing nodes that are configured to perform various functions for the network(s), e.g., a server computer system that incorporates one or more of a cable modem, gateway/router, wireless access point, bridge, switch and/or storage, which may also implement the functionality describe herein with reference to FIGS. 1-5. As shown in FIG. 1, the router 110 allows the network devices 102 of the LAN 100 to access the WAN 140 and receive content from the WAN 140. The LAN 100 is one of many LANs that form the WAN 140, which is may be generally referred to as the Internet 120. As illustrated, the WAN 140 may also include various networks of servers (and other network devices and software). In one example, a network of servers can implement cloud computing on the Internet 120, which will be referenced herein as the cloud computing network 150 (or the cloud 150). The router 110 may allow the LAN 100 to obtain the benefit of various services provided by the cloud 150 via the Internet 120. Various other routers (e.g., routers 185 and 195) servicing other LANs can also connect to the cloud 150. Since all the routers are connected to the Internet, using cloud computing resources available at the cloud 150 to augment the routers can result in more sophisticated routers and also reduce the cost of the routers.

The cloud 150 may be configured to use the concept of crowdsourcing to collect statistics from various routers connected to the Internet 120 and refine the network management algorithms running in the routers, which can result in smarter "learning" routers that leverage the experience of all the other routers connected to the cloud 150. In some embodiments, the router 110 (and also various routers such as routers 185 and 195) can report various types of network events, statistical information and other network activity to the cloud 150. For example, as will be described further below, the router 110 can report information associated with packet streams that are received at the router that are unknown, and oversubscription events in the LAN 100 that are detected by the router. The cloud 150 can aggregate data associated with the network events reported by various routers and analyze the data to improve and update router policies and procedures (e.g., update the network management algorithms stored at the routers). The router 110 can also send network activity reports to the cloud 150 to allow the cloud to perform network analysis on the LAN 100 and send network alerts to the router. In addition to the router 110 reporting network activity, the router 110 can utilize storage at the cloud 150. The cloud 150 can monitor the network activity and storage utilization to personalize services and offer suggestions for the LAN 100 and the users of the LAN 100 (e.g., perform common file and software downloads during off-peak nighttime hours).

In some implementations, the router 110 may be configured to intelligently detect the applications generating and processing packet streams to and from the WAN 140 through the router 110. For example, the router 110 may detect a packet stream from a Netflix® video streaming application (e.g., implemented in a first network device 102) and a packet stream from a file download application (e.g., bit torrent implemented in a second network device 102) actively sending packets through the router 110. In some examples, the servers that provided the video streaming service (or other content) can stream the video content to the LAN 100 via the router 110 and to a client application being executed at one of the network devices 102. However, in some cases, the router 110 may detect an unknown packet stream, or determine that a packet stream is unrecognizable. In other cases, a known application with known stream "fingerprints" or stream characteristics may change the packet streams it produces (i.e., change the stream characteristics), which can make a previously detectable packet stream undetectable. In one implementation, the router 110 can be configured to send information (e.g., stream characteristics) about all unknown packet streams to one or more servers of the cloud computing network 150. The cloud 150 can access the related aggregate data that has been collected from various other routers regarding unknown packet streams. Based on performing packet inspection and/or statistical analysis on the related aggregate data, and also based on continuously monitoring packet streams from various service providers on the Internet 120, the cloud 150 can intelligently identify the unknown packet streams. Then, the cloud 150 can download new detection rules to the router 110 (and also to the other routers such as router 185 and 195).

In some implementations, the router 110 may be configured with algorithms to detect the most common application packet streams (e.g., the top 100 applications) that are sent via the Internet. Any other unknown packet streams that pass through the router 100 can be sent to the cloud 150 for detection and identification. In one example, after the unknown packet information is sent to the cloud 150 for further analysis, the router 110 may temporarily assign the unknown packet stream a default classification. For example, although the router 110 may not be able to detect the specific application associated with the packet stream, the router 110 can determine the packet stream is streaming video and can temporarily assign a default classification for video traffic. In other words, even though the router 110 may not be able to detect the specific application, the router 110 may detect the application type (e.g., video traffic) and select a default classification for the unknown packet stream based on the application type. After the cloud 150 determines the new detection rules, the results can be sent back to the router 110 and the router 110 can implement the new detection rules to identify and process the packet stream appropriately. This creates a self-feedback loop where the router 110 runs the detection algorithms, collects statistics that are sent to the cloud 150, the statistics from various routers are aggregated and analyzed at the cloud 150, and new detection algorithms are subsequently determined and sent out to all the routers.

In some implementations, the router 110 can also report oversubscription events in the LAN 100. The router 110 can report how the router handled different types of oversubscription events in the LAN 100. In one example, some users of the LAN 100 may initiate five different video streaming applications to simultaneously stream five movies from the WAN 140 through the router 110 and to the different network devices 102 of the LAN. In this situation, the network will likely not have the enough bandwidth to support the five different packet streams for the five difference video streaming applications, and therefore the router will detect an oversubscription event. The router 110 can implement one technique to resolve the oversubscription event and report the technique that was used and the results to the cloud 150. For example, the router 110 can determine to decrease the bandwidth of all the video streams by a certain percentage (e.g., 10-20%). The servers in the cloud 150 can use the aggregate data collected from other routers for a similar scenario, perform analysis, and determine there is better technique to handle the oversubscription event that the router 110 encountered. The servers in the cloud 150 can then provide the details regarding the new oversubscription resolution technique to the router 110, i.e., one or more servers of the cloud 150 can program the router 110 with a new algorithm to resolve that type of oversubscription event. For example, the cloud 150 may determine that instead of reducing the bandwidth of all five video streams by 15%, the router 110 should maintain an optimal bandwidth for 4 of the video streams, and reduce the bandwidth of one of the video streams to a minimum acceptable level.

In some implementations, the router 110 can also report some or all of the network activity to the cloud 150 and store most or all of the data in the cloud 150. In response to detecting reports and collecting data from the router 110, the cloud 150 can perform network analysis on the LAN 100 and also send network alerts. The cloud 150 can perform network analysis over weeks, months, and years, without the limitation that a local network router or other device would inherently have, such as limited resources and storage. In one example, based on the network activity reports, the cloud 150 can determine that a certain device or class of devices uses a disproportionate amount of bandwidth when the device is active (e.g., the device continuously transmits). The cloud 150 can monitor the LAN 100 and send a network alert when it detects the device is active and exhibiting such a behavior. In another example, the cloud 150 can detect that the upstream traffic is overloaded, and send a network alert to the router 110 suggesting that the router 110 reduce the advertised available bandwidth in half (e.g., from 10 mbps to 5 mbps) to reduce the upstream traffic and potentially obtain better performance. It is noted that the router 110 can report other types of network events. In some cases, the router 110 can report network failures to the cloud 150, and the cloud 150 can determine resolution procedures based on the aggregate data and report the solution to the router 110 (e.g., configuration updates or new resolution procedure steps). In some implementations, since the cloud 150 is receiving most or all of the network activity and network events associated with the LAN 100 from the router 110, the cloud 150 can also offer other personalized services for the LAN 100. For example, the cloud 150 can detect that a software program (e.g., Adobe® Acrobat®) in one or more of the network devices 102 is configured for automatic updates (or the user regularly checks for updates). When the cloud 150 receives information from another router that a user is downloading an update, it can inform other routers that have updated the application in the past that an update is available and that the router should download it (e.g., temporarily store it in cache) when traffic is light (e.g., at off-peak hours). In another example, the cloud 150 can detect that one of the users downloads e-books from a certain author when the e-books are released. Based on this activity, the cloud 150 can automatically download the e-book to the local storage at the router 110 when the author releases a new e-book, so the user can access and download the e-book locally without using the WAN link.

As shown in FIG. 1, in some embodiments, the router 110 may include a network monitoring unit 112, one or more processors 115, and a memory unit 118. The network monitoring unit 112, the one or more processors 115, and the memory unit 118 of the router 110 may be configured to implement the network event monitoring and reporting operations described herein, which operate in conjunction with the cloud computing network 150. In some embodiments, the one or more processors 115 of the router 110 can execute program instructions (e.g., stored in the memory unit 118) associated with the network monitoring unit 112 to implement the network event monitoring and reporting techniques described herein, such as the reporting of unknown packet streams and oversubscription events to the cloud 150 and the implementation of the new detection and resolution policies based on information obtained from the cloud 150. In some implementations, the router 110 may include a network interface card (or module) 111. The network interface card 111 may implement the network monitoring unit 112, the one or more processors 115, and a memory unit 118 (e.g., in one or more integrated circuits). In other implementations, the router 110 may include a plurality of network interface cards and circuit boards (including network interface card 111), and the plurality of network interface cards may implement the network monitoring unit 112, the one or more processors 115, and a memory unit 118. Although not shown in FIG. 1, in some implementations, the router 110 may include one or more additional processors and memory units (and other components) besides processor(s) 115 and memory unit 118. For example, the router 110 may include one or more processors and one or more memory units in one or more additional circuit boards.

Figure 2:
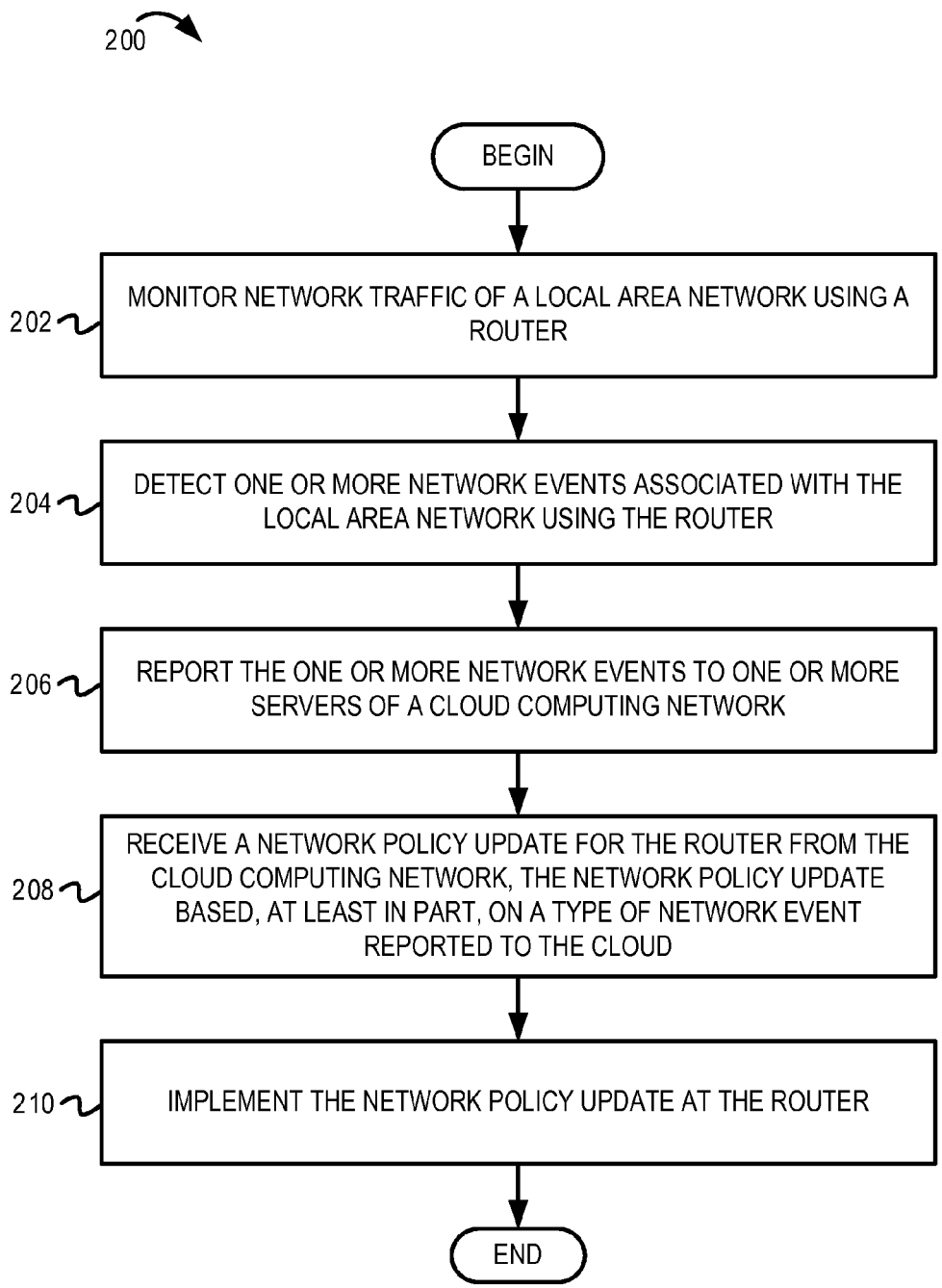
FIG. 2 is a flow diagram illustrating example operations for implementing the cloud computing enhanced router for a local area network shown in FIG. 1, according to some embodiments.

FIG. 2 is a flow diagram ("flow") 200 illustrating example operations for implementing the cloud computing enhanced router for a local area network shown in FIG. 1, according to some embodiments. The flow begins at block 202 of FIG. 2.

At block 202, network traffic of a local area network is monitored using a router. For example, the network monitoring unit 112 of the router 110 (shown in FIG. 1) monitors network traffic that is sent from one or more network devices 102 to the WAN 140 (e.g. file uploads), and network traffic that is received at the LAN 100 from the WAN (e.g., video streaming). In addition, the network monitoring unit 112 can monitor network traffic that is sent between the network devices 102 in the LAN 100. After block 202, the flow continues at block 204.

At block 204, one or more network events associated with the local area network are detected using the router. In some implementations, the network monitoring unit 112 detects one or more network events based on the network traffic of the LAN 100. As described above, in some examples, the network monitoring unit 112 may detect an unknown packet stream that is routed via the router 110 and/or detect an oversubscription event in the LAN 100. The network monitoring unit 112 may also detect other network events, such as network failures or disproportionate use of network bandwidth. After block 204, the flow continues at block 206.

At block 206, the one or more network events are reported from the router to a cloud computing network. In some implementations, the network monitoring unit 112 may report the one or more network events from router 110 to one or more servers of the cloud computing network 150. In some implementations, instead of reporting all network events or network activities to the cloud computing network 150, the router 110 can be configured to report certain network events ("predefined network events"). For example, the router 110 may be configured to report only oversubscription events and unknown packet streams to the cloud 150. After block 206, the flow continues at block 208.

At block 208, a network policy update for the router is received from the one or more servers of the cloud-based computing network. The network policy update is based, at least in part, on a type of network event reported to the one or more servers of the cloud-based computing network. In some implementations, the router 110 receives the network policy update from the cloud 150. The network policy update that is received is based, at least in part, on the type of network event that was reported to the cloud 150. For example, the cloud 150 may determine the network policy update based on the type of network event that was reported and based on results of an analysis that is performed on aggregate data associated with the same type of network event collected from a plurality of local area networks of the WAN 140, as will be further described below with reference to FIG. 3. For example, if the network event reported by the router 110 is an unknown packet stream detected at the router 110, the cloud 150 performs an analysis on aggregate data that has been collected from the LAN 100 and from other local area networks in the WAN 140 that also have detected some of the same packet stream characteristics in an unknown packet stream. From the aggregate data, the cloud 150 can determine new packet stream detection policies based on the characteristics of the unknown packet stream for future detection and identification of the unknown packet stream. The cloud 150 can then send the new packet stream detection policies to the router 110 to update the stream detection policies being implemented at the router 110. After block 208, the flow continues at block 210.

At block 210, the network policy update is implemented at the network traffic managing node after configuration. In some implementations, the network monitoring unit 112 is configured with the network policy update and then implements the network policy update at the router 110 when detecting and processing network events of the LAN 100. For example, in the unknown packet stream example, the network monitoring unit 112 can be updated to implement the new packet stream detection policies received from the cloud 150 for packet stream detection and identification. After block 210, the flow ends.

Figure 3:
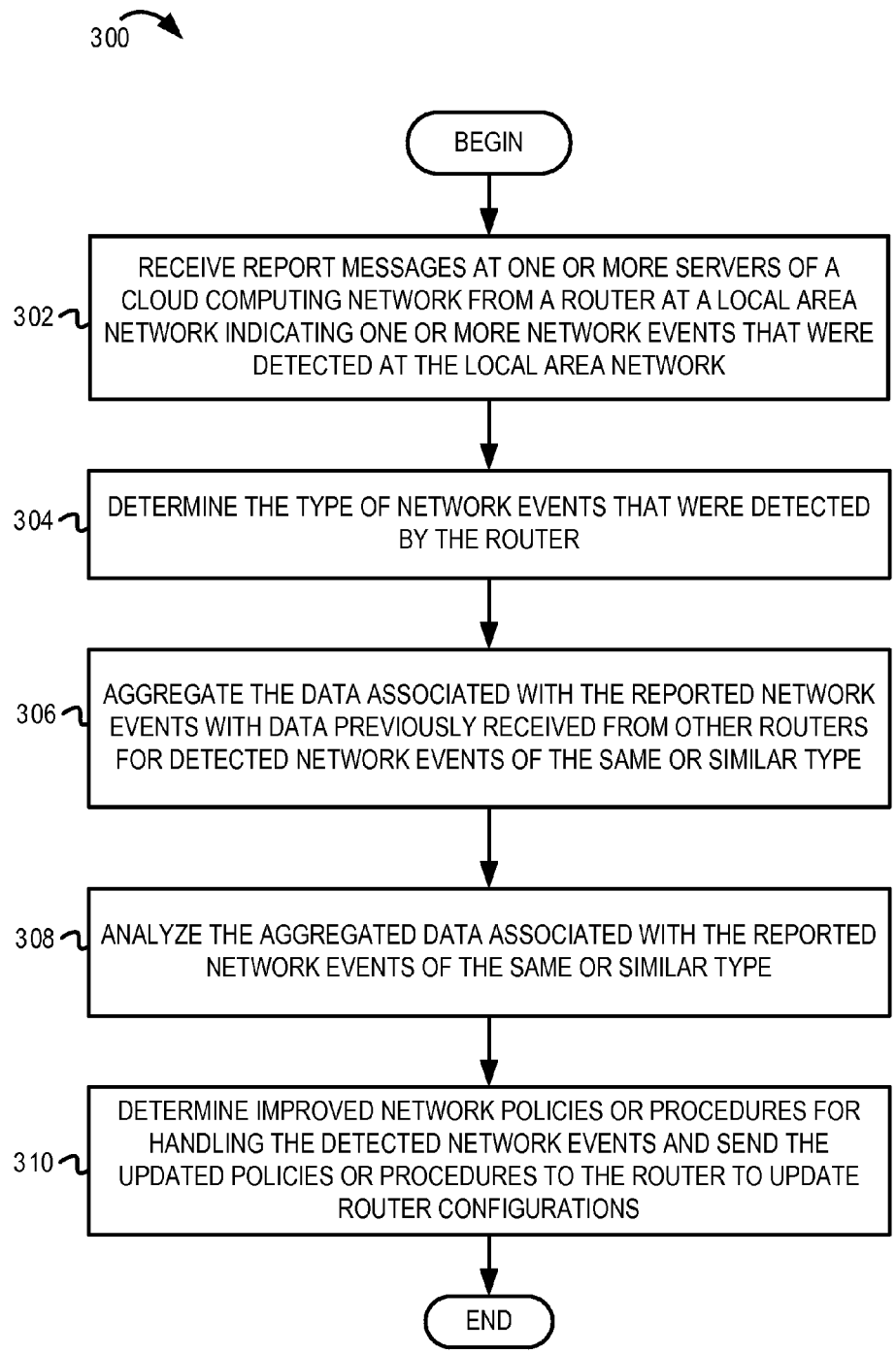
FIG. 3 is a flow diagram illustrating example operations for implementing the cloud computing enhanced router system shown in FIG. 1, according to some embodiments.

FIG. 3 is a flow diagram ("flow") 300 illustrating example operations for implementing the cloud computing enhanced router system shown in FIG. 1, according to some embodiments. The flow begins at block 302 of FIG. 3.

At block 302, one or more servers of the cloud computing network 150 receive report messages from the router 110 indicating network events that were detected in the LAN 100. For example, as was previously described above, the router 110 can determine one of the packet streams being routed is unknown, and can send information associated with the unknown packet stream to the cloud 150. As another example, the router 110 can detect an oversubscription event at the LAN 100 and send a report to the cloud 150 indicating the technique that was implemented to attempt to resolve the oversubscription event. In the report, the router 110 can also indicate whether that particular technique was successful in resolving the oversubscription event and the specific results of technique. After block 302, the flow continues at block 304.

At block 304, the cloud computing network 150 determines the type of network event associated with the report messages received from the router 110. For example, the cloud 150 determines that the report message is associated with an unknown packet stream that was received at the router 110, or that the report message is associated with an oversubscription event detected at the LAN 100. It is noted, however, that the report message may indicate various other network events, as was described above with reference to FIG. 1 (e.g., a network failure report). After block 304, the flow continues at block 306.

At block 306, the cloud computing network 150 aggregates the data associated with the reported network events with data previously received from other routers in other local area networks for detected network events of the same or similar type. For example, the cloud 150 aggregates all the information (e.g., packet stream characteristics) associated with unknown packet streams that have been reported by various routers. As another example, the cloud 150 aggregates all the data (e.g., resolution techniques used and results) associated with oversubscription events of the same or similar type that are reported by various routers. After block 306, the flow continues at block 308.

At block 308, the cloud computing network 150 analyzes the aggregated data associated with the reported network events of the same or similar type. For example, the cloud 150 analyzes the aggregated data associated with the unknown packet streams that have been reported by various routers in other local area networks. In one example, the cloud 150 can perform deep packet inspection and statistical analysis on the aggregated data associated with the unknown packet streams, and can analyze the different stream characteristics associated with the unknown packet streams. At the same time, the cloud 150 can continuously monitor packet streams from various service providers on the Internet 120, and identify any changes in the corresponding packet streams, in order to help identify the unknown packet streams. In another example, the cloud 150 can analyze the aggregated data associated with various oversubscription events that have been reported by various routers. The cloud 150 can examine the various techniques used to resolve the oversubscription event and compare the results of implementing the different techniques. After block 308, the flow continues at block 310.

At block 310, the cloud computing network 150 determines improved network policies or procedures for handling the detected network events and sends the updated network policies or procedures to the router 110 of the LAN 100 to update router configurations. For example, based on the analysis performed in block 308 above, the cloud 150 can determine improved packet stream detection policies (e.g., updated stream characteristic criteria) for detecting the packet streams or can determine improved resolution policies for handling the oversubscription event. After block 310, the flow ends.

In some implementation, the cloud computing network 150 determines and sends the network policy updates to the router 110 in real time. For example, if the cloud computing network 150 has aggregated sufficient data from the various routers in the WAN 140, and has performed the analysis of the aggregate data, the cloud computing network 150 can send the network policy updates to the router 110 in real time when the router 110 reports the network event. As a result, the router 110 can implement the network policy updates in real time to process and/or resolve the reported network event in real time. In some implementations, after receiving the report message(s) associated with a network event from the router 110, the cloud computing network 150 can continue aggregating additional data associated with the network event from other routers in the WAN 140, and/or may perform additional analysis on the aggregated data. For example, the cloud computing network 150 may determine that it needs to crowd source additional data and/or perform additional analysis in order to determine an improved network policy for the network event. In this example, the cloud computing network 150 would not send the network policy update to the router 110 in real time. Instead, the cloud computing network 150 would send the network policy update at a later time, and the router 110 would implement the network policy update to process and/or resolve the next occurrence of the network event.

Figure 4:
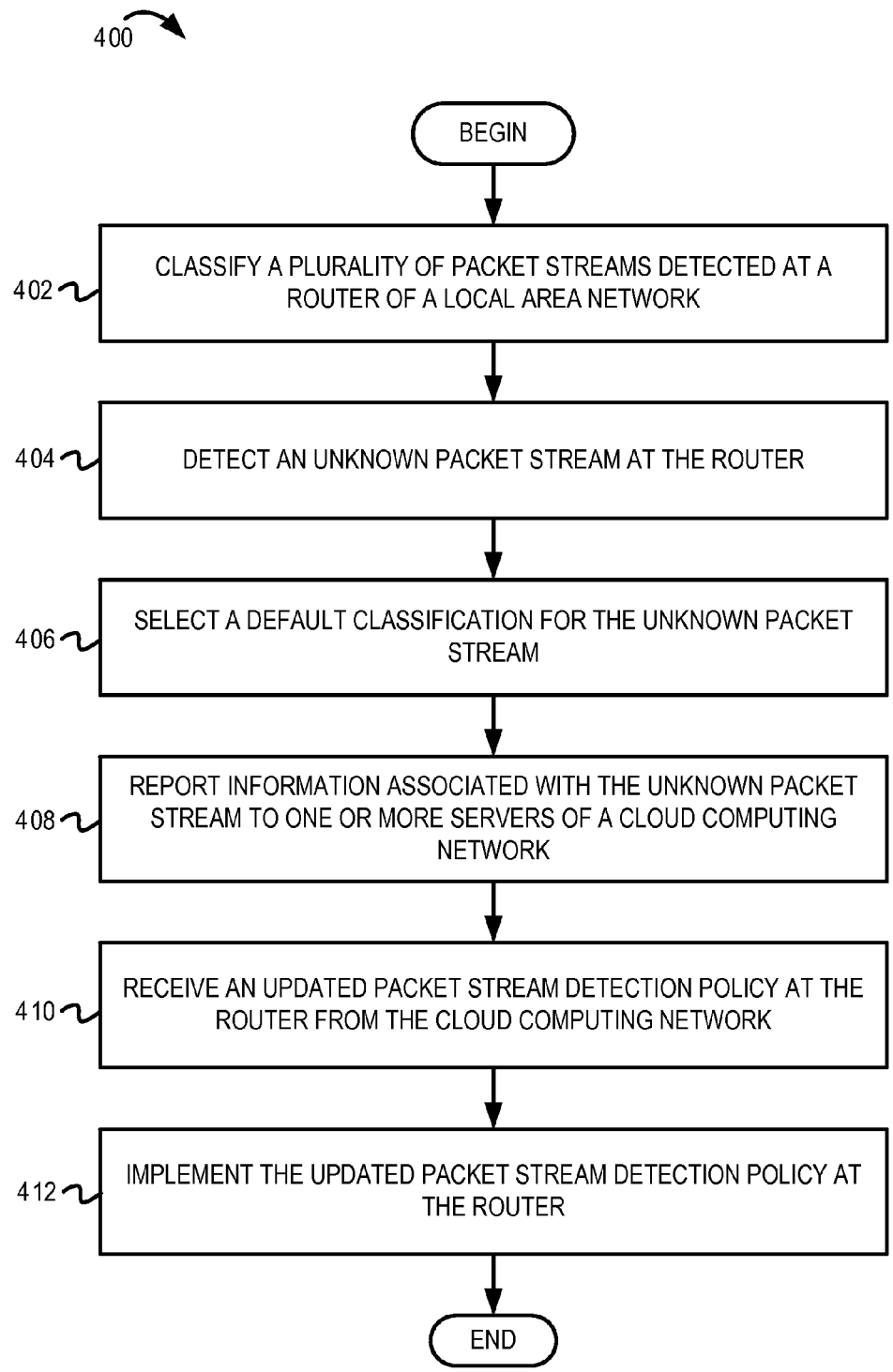
FIG. 4 is a flow diagram illustrating example operations for implementing packet stream detection in the cloud computing enhanced router described in FIGS. 1-3, according to some embodiments.

FIG. 4 is a flow diagram ("flow") 400 illustrating example operations for implementing packet stream detection in the cloud computing enhanced router described in FIGS. 1-3, according to some embodiments. The flow begins at block 402 of FIG. 4.

At block 402, a plurality of packet streams detected at a router of a local area network are classified. In some implementations, the network monitoring unit 112 of the router 110 (shown in FIG. 1) monitors network traffic, detects the plurality of packet streams, and classifies the packet streams. For example, after detecting characteristic and statistics of a packet stream (e.g., using deep packet inspection), the network monitoring unit 112 can determine the application associated with the packet stream and classify the packet stream based on the associated application. In one example, if the packet stream characteristics and statistics indicate the packet stream is distributed from the Netflix® video streaming service, the network monitoring unit 112 classifies the packet stream as a Netflix® application packet stream. After block 402, the flow continues at block 404.

At block 404, an unknown packet stream is detected at the router. In some implementations, the network monitoring unit 112 detects the packet stream characteristics and statistics, compares the packet stream characteristics and statistics to known packet streams, and determines the packet stream is an unknown packet stream with unknown packet stream characteristics and statistics. After block 404, the flow continues at block 406.

At block 406, a default classification for the unknown packet stream is selected. In some implementations, even though the network monitoring unit 112 cannot determine the specific application associated with the unknown packet stream, the network monitoring unit 112 may select a default classification based on the application type (e.g., streaming video or audio) associated with the unknown packet stream. For example, the application type of the unknown packet stream may be determined as streaming video or streaming audio, and a default classification maybe assigned to the unknown packet stream based on the application type. In some implementations, the network monitoring unit 112 may not be able to determine both the specific application and the application type associated with an unknown packet stream, and therefore may temporarily select a default classification for a packet streams with an unknown application and application type. The default classification may be temporarily assigned to allow the unknown packet stream to be processed by the router 110 until the specific application can be determined. For example, the default classification may assign the unknown packet stream minimum and maximum bandwidth requirements and, in some cases, a priority value. In one example, if a default classification is selected for the unknown packet stream based on video streaming as the application type, the default classification assigns minimum and maximum bandwidth requirements that are typical for video streaming applications (e.g., average bandwidth numbers for video streaming applications). After block 406, the flow continues at block 408.

At block 408, information associated with the unknown packet stream is reported to one or more servers of a cloud computing network. In some implementations, the network monitoring unit 112 can send a report message indicating the packet stream characteristics and statistics associated with the unknown packet stream from the router 110 to the cloud 150 via the Internet. After block 408, the flow continues at block 410.

At block 410, an updated packet stream detection policy is received from the cloud computing network. In some implementations, the network monitoring unit 112 can receive an updated packet stream detection policy from the cloud 150 that can be used for detecting and classifying the previously unknown packet stream. In one example, the cloud 150 performs an analysis on aggregate data that has been collected from the router 110 and from other local area networks in the WAN 140 that also have detected some of the same packet stream characteristics and statistics in an unknown packet stream. The cloud also continues to collect packet stream characteristics and statistics from service providers and applications in the Internet. From the aggregate data, the cloud 150 can determine new packet stream detection policies based on the characteristics and statistics of the unknown packet stream for future identification and classification of the unknown packet stream. For example, the cloud 150 may determine that the unknown packet stream is from a new audio streaming service that was recently brought online after comparing the packet stream characteristics and statistics from the new audio streaming service with the packet stream characteristics and statistics aggregated by the cloud 150. In another example, the cloud 150 can determine that an existing video streaming service changed the packet stream characteristics and statistics associated with its service and applications. After block 410, the flow continues at block 412.

At block 412, the updated packet stream detection policy is implemented at the router. In some implementations, the network monitoring unit 112 implements the updated packet stream detection policy after the router 110 is configured with the new policy. The updated packet stream detection policy can be used for subsequent detection and classification of the previously unknown packet stream. After flow 412, the flow ends.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
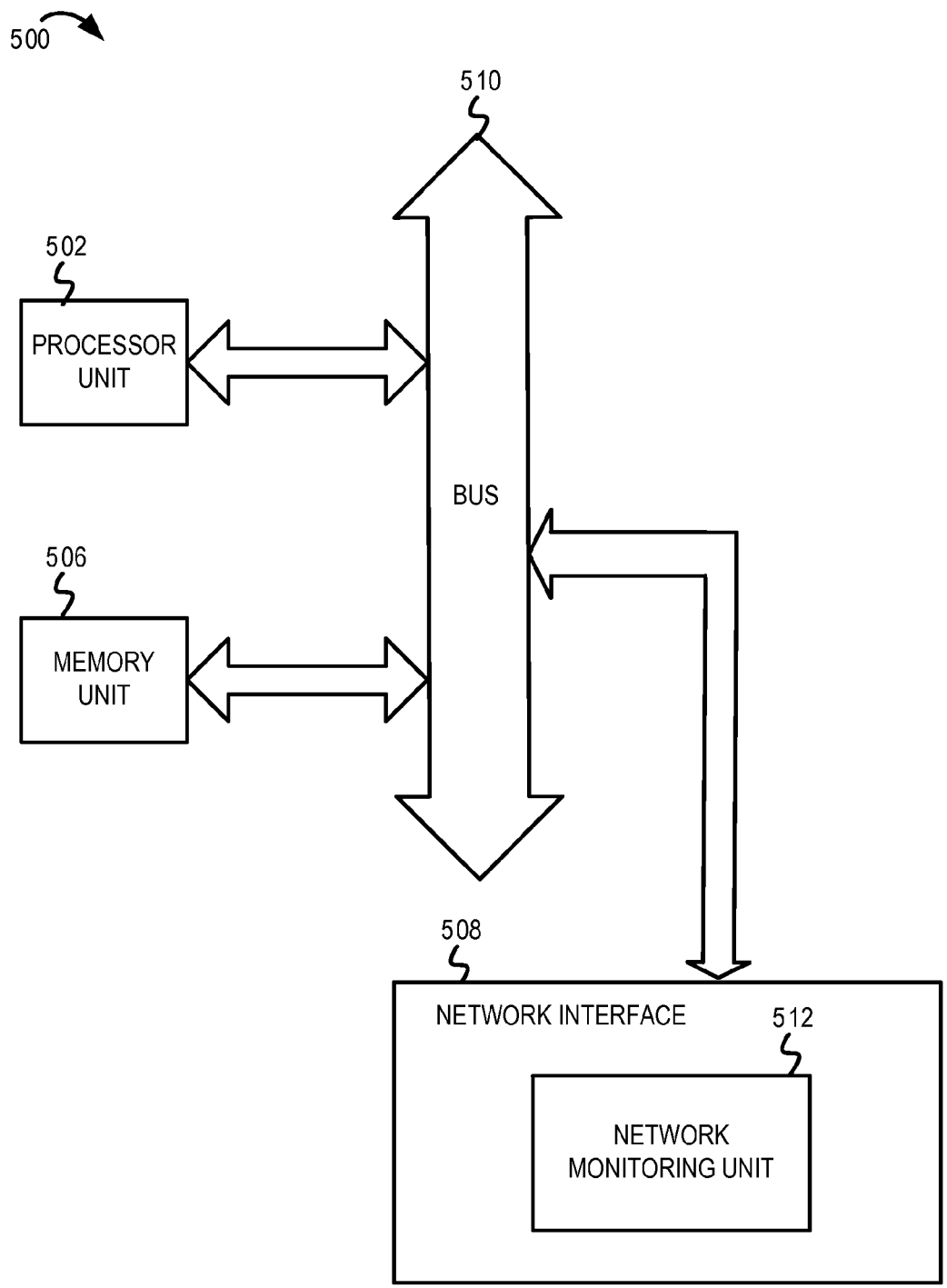
FIG. 5 is a block diagram of one embodiment of a network device including a mechanism for local area network routing, monitoring and cloud-based support, according to some embodiments.

FIG. 5 is a block diagram of one embodiment of a network device 500 including a mechanism for local area network monitoring and cloud-based support in a wide area network, according to some embodiments. In some implementations, the network device 500 is a network traffic managing node between two or more networks (e.g., a LAN and a WAN) that receives, processes, and routes packets associated with the networks; for example, the network traffic managing node may be a router/gateway of a LAN (e.g., LAN 100 shown in FIG. 1). It is noted, however, that in other implementations the network device 500 may be other suitable types of network devices that can be configured to implement the functionality described above with reference to FIGS. 1-4, such as a cable modem, a wireless access point, a network bridge, a network switch, a desktop computer, a gaming console, a mobile computing device, etc. The network device 500 includes a processor unit 502 (possibly including multiple processors, multiple cores, multiple nodes, and/or implementing multi-threading, etc.). The network device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The network device 500 also includes a bus 510 (e.g., PCI, ISA, PCI-Express, HyperTransport®, InfiniBand®, NuBus, AHB, AXI, etc.), and network interface(s) 508 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.). As illustrated, the network interface(s) 508 also includes a network monitoring unit 512. For example, the network monitoring unit 512 may be implemented within a network interface card or network interface module of the network interface(s) 508. The network monitoring unit 512 may be operable to implement the mechanism for network traffic monitoring, network event detection, and cloud-based access and support (among other features) for the network device 500, as describe above with reference to FIGS. 1-4.

Any one of these functionalities may be partially (or entirely) implemented in hardware and/or on the processor unit 502. For example, the functionality may be implemented with one or more application specific integrated circuits, one or more system-on-a-chip (SoC), or other type of integrated circuit(s), in logic implemented in the processor unit 502, in a co-processor on a peripheral device or card, in a separate processor and/or memory implemented within the network interface 508, etc. Further, realizations may include fewer or additional components not illustrated in FIG. 5 (e.g., video cards, audio cards, additional network interfaces, peripheral devices, etc.). The processor unit 502, the memory unit 506, and the network interfaces 508 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for implementing cloud computing enhanced routers for communication networks as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   monitoring network traffic of a first network;
   detecting a network event associated with the first network;
   reporting the network event to a server of a second network;
   receiving a network policy update for the first network from the server, wherein the network policy update is based, at least in part, on an event type of the network event reported to the server; and
   implementing the network policy update at the first network.

2. The method of claim 1, wherein said monitoring, detecting, reporting, receiving, and implementing are performed by a managing node of the first network.

3. The method of claim 2, wherein the managing node comprises a router of the first network.

4. The method of claim 2, wherein the managing node comprises a computer system including at least one member of a group consisting of a router, an access point, a cable modem, and a network switch of the first network.

5. The method of claim 1, wherein said detecting the network event associated with the first network comprises at least one member of a group consisting of, detecting an oversubscription event at the first network, detecting an unknown packet stream at the first network, and detecting a network failure event at the first network.

6. The method of claim 1, wherein said implementing the network policy update comprises implementing the network policy update after configuring a managing node of the first network to process and resolve the network event.

7. The method of claim 1, wherein said monitoring the network traffic comprises,
monitoring the network traffic sent from a plurality of devices of the first network to a wide area network; and
monitoring the network traffic sent from a remote network node of the wide area network to the plurality of devices of the first network.

8. The method of claim 1, wherein the network policy update is based at least in part, on the event type and an analysis of aggregate data associated with the event type that is collected at the second network from a third network, wherein the first network and the third network are local area networks.

9. The method of claim 1, further comprising:
detecting network activity associated with the first network;
reporting the network activity to the server; and
receiving network alerts at the first network from the second network.

10. A method comprising:
detecting an unknown packet stream at a managing node of a first network;
selecting a default classification for the unknown packet stream;
reporting information associated with the unknown packet stream from the managing node to a server of a second network;
receiving, at the managing node, a policy update for the unknown packet stream from the second network, wherein the policy update indicates how to detect and classify a subsequent instance of the unknown packet stream; and
implementing the policy update at the managing node.

11. The method of claim 10, further comprising:
detecting a packet stream characteristic associated with a packet stream detected at the managing node;
determining an application associated with the packet stream based, at least in part, on the packet stream characteristic; and
classifying the packet stream based, at least in part, on the application.

12. The method of claim 11, wherein
said classifying the packet stream is based, at least in part, on an application type of the application.

13. The method of claim 10, wherein said detecting the unknown packet stream and selecting the default classification comprises:
determining that an application associated with the unknown packet stream is unknown to the managing node; and
selecting the default classification for the unknown packet stream in response to determining that the application is unknown.

14. The method of claim 10, wherein said detecting the unknown packet stream at the managing node and selecting the default classification comprises:
determining that an application associated with the unknown packet stream is unknown to the managing node;
determining an application type associated with the unknown packet stream; and
selecting the default classification for the unknown packet stream based, at least in part, on the application type.

15. The method of claim 10, wherein said reporting the information comprises reporting at least one packet stream characteristic associated with the unknown packet stream.

16. The method of claim 10, further comprising receiving classifying information indicating an application associated with the unknown packet stream and a classification for the unknown packet stream.

17. The method of claim 10, wherein said implementing the policy update at the managing node comprises:
detecting, at the managing node, a packet stream characteristic associated with a previously unknown packet stream according to the policy update;
determining an application associated with the packet stream characteristic according to the policy update; and
selecting a classification for the previously unknown packet stream based on the application.

18. A method comprising:
receiving, at a server of a first network, a report message from a first router of a second network indicating a first network event that was detected at the first router;
determining an event type of the first network event;
aggregating data associated with the event type with data previously received from a second router that detected a second network event of the event type;
analyzing the aggregated data;
determining a network policy update associated with the event type based on a result of analyzing the aggregated data; and
sending the network policy update to the first router to configure the first router with the network policy update.

19. The method of claim 18, wherein said determining the event type comprises determining that the event type is at least one member of a group consisting of an oversubscription event at the second network, a detection of an unknown packet stream at the first router, a receipt of a network analysis report from the first router, and a detection of a network failure event at the second network.

20. The method of claim 18, further comprising requesting temporary storage of content related to the event type at the first router based, at least in part, on the result of analyzing of the aggregated data.

21. The method of claim 18, wherein the network policy update indicates operations to process and resolve a network event of the event type detected at the first router.

22. A network router comprising:
a processor; and
a memory unit configured to store instructions which, when executed by the processor, cause the network router to,
monitor network traffic of a first network;
detect a network event associated with the first network;
report the network event to a server of a second network;
receive a network policy update for the network router from the server, wherein the network policy update is based, at least in part, on an event type of the network event; and
implement the network policy update at the network router.

23. The network router of claim 22, wherein the network event comprises at least one member of group consisting of an oversubscription event at the first network, an unknown packet stream received at the network router, and a network failure event at the first network.

24. The network router of claim 22, wherein the instructions executed by the processor further cause the network router to process and resolve the network event by implementing the network policy update after configuring the network router.

25. The network router of claim 22, wherein the instructions executed by the processor further cause the network router to,
   detect network activity associated with the first network;
   report the network activity to the server; and
   receive network alerts from the second network.

26. A network router comprising:
   a processor; and
   a network monitoring unit coupled with the processor and configured to,
      detect an unknown packet stream received at the network router of a first network;
      select a default classification for the unknown packet stream;
      report information associated with the unknown packet stream to a server of a second network;
      receive, from the second network, a policy update for the unknown packet stream, wherein the policy update indicates how to detect and classify a subsequent instance of the unknown packet stream; and
      implement the policy update at the network router.

27. The network router of claim 26, wherein the network monitoring unit is further configured to,
   detect a packet stream characteristic associated with a packet stream detected at the network router;
   determine an application associated with the packet stream based, at least in part, on the packet stream characteristic; and
   classify the packet stream based, at least in part, on the application.

28. The network router of claim 27, wherein the network monitoring unit is configured to classify the packet stream based, at least in part, on an application type associated with the application.

29. The network router of claim 26, wherein the network monitoring unit configured to detect the unknown packet stream and select the default classification comprises the network monitoring unit configured to,
   determine that an application associated with the unknown packet stream is unknown to the network router; and
   select the default classification for the unknown packet stream in response to determining the application is unknown.

30. The network router of claim 26, wherein the network monitoring unit configured to detect the unknown packet stream and select the default classification comprises the network monitoring unit configured to,
   determine that an application associated with the unknown packet stream is unknown to the network router;
   determine an application type associated with the unknown packet stream; and
   select the default classification for the unknown packet stream based on the application type.

31. The network router of claim 26, wherein the network monitoring unit configured to report the information comprises the network monitoring unit configured to report at least one packet stream characteristics associated with the unknown packet stream.

32. The network router of claim 26, wherein the network monitoring unit configured to implement the policy update comprises the network monitoring unit configured to,
   detect a packet stream characteristic associated with a previously unknown packet stream according to the policy update;
   determine an application associated with the packet stream characteristics according to the policy update; and
   select a classification for the previously unknown packet stream based on the application.

33. A non-transitory machine-readable storage media having stored therein instructions, which when executed by a processor causes the processor to,
   detect an unknown packet stream at a first network;
   select a default classification for the unknown packet stream;
   report information associated with the unknown packet stream to a server of a second network;
   receive a policy update for the unknown packet stream from the second network, wherein the policy update indicates how to detect and classify a subsequent instance of the unknown packet stream; and
   implement the policy update.

34. The non-transitory machine-readable storage media of claim 33, wherein the instructions, when executed by the processor, are further to,
   classify a packet stream detected at the first network, wherein
      said classifying the packet stream is based, at least in part, on at least one member of a group consisting of an application associated with the packet stream, and an application type associated with the application.

35. The non-transitory machine-readable storage media of claim 33, wherein the instructions, when executed by the processor to detect the unknown packet stream and select the default classification are further to,
   determine that an application associated with the unknown packet stream is unknown; and
   select the default classification for the unknown packet stream in response to determining that the application is unknown.

36. The non-transitory machine-readable storage media of claim 33, wherein the instructions, when executed by the processor to detect the unknown packet stream and select the default classification are further to,
   determine that an application associated with the unknown packet stream received at the first network is unknown;
   determine an application type associated with the unknown packet stream; and
   select the default classification for the unknown packet stream based on the application type.

* * * * *